United States Patent
Fujita et al.

(10) Patent No.: US 8,732,189 B2
(45) Date of Patent: May 20, 2014

(54) COMMAND EXECUTION PROGRAM AND COMMAND EXECUTION METHOD

(75) Inventors: Takeshi Fujita, Chiba ken (JP); Tsutomu Kawachi, Tokyo (JP); Keiichi Ogawa, Tokyo (JP)

(73) Assignee: Sony Corporation, Tokyo (JP)

( * ) Notice: Subject to any disclaimer, the term of this patent is extended or adjusted under 35 U.S.C. 154(b) by 978 days.

(21) Appl. No.: 12/304,205

(22) PCT Filed: Jun. 12, 2007

(86) PCT No.: PCT/JP2007/061839
§ 371 (c)(1),
(2), (4) Date: May 23, 2011

(87) PCT Pub. No.: WO2007/145222
PCT Pub. Date: Dec. 21, 2007

(65) Prior Publication Data
US 2011/0213794 A1    Sep. 1, 2011

(30) Foreign Application Priority Data
Jun. 12, 2006  (JP) .................................. 2006-162932

(51) Int. Cl.
*G06F 17/30*  (2006.01)
*G06F 1/00*  (2006.01)

(52) U.S. Cl.
CPC ....................................... *G06F 1/00* (2013.01)
USPC ........................................................ 707/769

(58) Field of Classification Search
CPC ............................... G06F 21/53; G06F 21/629
USPC ....................................................... 707/769
See application file for complete search history.

(56) References Cited

U.S. PATENT DOCUMENTS

| | | | |
|---|---|---|---|
| 6,381,602 B1 * | 4/2002 | Shoroff et al. | 707/741 |
| 7,130,951 B1 | 10/2006 | Christie et al. | |
| 7,620,630 B2 * | 11/2009 | Lloyd et al. | 1/1 |
| 7,668,830 B2 * | 2/2010 | Hakala | 713/154 |
| 7,861,293 B2 * | 12/2010 | Terada et al. | 726/19 |
| 2004/0001706 A1 | 1/2004 | Jung et al. | |
| 2006/0123053 A1 * | 6/2006 | Scannell, Jr. | 707/104.1 |
| 2006/0245594 A1 * | 11/2006 | Terada et al. | 380/277 |

FOREIGN PATENT DOCUMENTS

| | | |
|---|---|---|
| JP | 11-175471 | 7/1999 |
| JP | 2003-085140 | 3/2003 |
| JP | 2003-242119 | 8/2003 |
| JP | 2005-528678 | 9/2005 |
| JP | 2005-531975 | 10/2005 |

OTHER PUBLICATIONS

International Search Report for corresponding PCT/JP2007/061839 dated Oct. 2, 2007.
Japanese Office Action for corresponding JP Application No. 2008-521221 dated Aug. 2, 2011.

* cited by examiner

*Primary Examiner* — Sheree Brown
(74) *Attorney, Agent, or Firm* — K&L Gates LLP

(57) ABSTRACT

[PROBLEMS] To limit execution of a predetermined command called from a content. [MEANS FOR SOLVING PROBLEMS] An information providing system includes processing means which receives a command execution request together with a command identifier and a request source domain identifier from an external terminal device (S30), reads out an entity of the command correlated with a combination of the received command identifier and the received domain identifier from storage means (S32), and executes the command according to the entity of the command which has been read out (S34).

13 Claims, 13 Drawing Sheets

COMMAND INFORMATION FILE

| COMMAND IDENTIFIER | DOMAIN IDENTIFIER | ENTITY OF COMMAND |
|---|---|---|
| cmd000 | domain0 | update |
| cmd001 (ls) | domain1 | ls /root |
| cmd001 (ls) | domain2 | ls /root/webapi |
| cmd001 (ls) | domain3 | prompt "impossible" |
| cmd002 (read) | domain1 | read (all) |
| cmd002 (read) | domain2 | read (first 10 lines) |
| cmd003 | domain1 | send (always OK) |
| cmd003 | domain2 | send (only 100 times/hour) |
| ⋮ | ⋮ | ⋮ |

Fig4

PERMISSION INFORMATION FILE

| CONTENT IDENTI | DOMAIN IDENTIFIER | PERMISSION IDENTIFIER |
|---|---|---|
| content001 | domain1 | p1 (rw-) |
| content001 | domain2 | p2 (r--) |
| content001 | domain3 | p2 (r--) |
| content002 | domain1 | p3 (r-x) |
| ⋮ | ⋮ | ⋮ |

Fig5

COMMAND INFORMATION FILE

| COMMAND IDENTIFIER | DOMAIN IDENTIFIER |
|---|---|
| cmd001 | domain1 |
| cmd002 | domain1 |
| cmd002 | domain2 |
| cmd003 | domain1 |
| ⋮ | ⋮ |

Fig12

CONTENT INFORMATION FILE

| CONTENT IDENTIFIER | DOMAIN IDENTIFIER |
|---|---|
| content001 | domain1 |
| content002 | domain2 |
| content003 | domain1 |
| ⋮ | ⋮ |

Fig13

COMMAND EXECUTION PROGRAM AND COMMAND EXECUTION METHOD

BACKGROUND

1. Field of the Invention

The present invention relates to a program executing command and, in particular, to a command execution program capable of limiting execution of a command by a domain to which a content calling the command belongs.

2. Description of the Related Art

Conventionally, an information providing system provides various application programs. Examples of the application programs include a file management program for copying, migrating, and deleting a file, and a text editor for editing a text file.

In the known example described above, however, when the application program is executed, it has been unable to limit execution of a predetermined command called from a content of the application program. For example, in a content of the file management program, it has been unable to limit execution of a command for deleting a file.

Moreover, conventionally, when a plurality of application programs provided by the same information providing system are executed within a frame of a web browser at a terminal device, the application programs have been executed in the same domain.

However, in the known example described above, data are mutually acquired among the application programs. Therefore, it has been unable to prevent their respective data and functions from leaking among the application programs.

As far as known to the applicant, there is no related art documents associated with the above descriptions.

SUMMARY

The present invention improves disadvantages of the known examples described above and, in particular, limiting execution of a predetermined command called from a content and preventing their respective data and functions from leaking among application programs.

Means To Solve Problem

To solve the above-described problems, the following configuration is applied in the invention. The invention defined in claim 1 includes a command execution program used for an information providing system comprising storage means, communicating means, and processing means, allowing the processing means to execute a method, the method comprising the steps of:

storing a domain identifier for identifying a domain, correlated with a command identifier for identifying a command against the information providing system in the storage means;

(a) receiving a command execution request together with the command identifier of the command, and the domain identifier of the domain to which a content calling the command belongs, from an external terminal device through the communicating means;

(b) reading out the domain identifier correlated with the received command identifier from the storage means; and (c) executing the command corresponding to the received command identifier, when the domain identifier received at the step (a) and the domain identifier read out at the step (b) are identical.

The invention defined in claim 2 is command executing program as defined in claim 1, characterized that the step (c) is the steps of executing the command corresponding to the received command identifier, when the domain identifier received at the step (a) and the domain identifier read out at the step (b) are not identical.

The invention defined in claim 3 includes a command execution program used for an information providing system comprising storage means, communicating means. And it allows the storage means to store an entity of a command correlated with a combination of a command identifier for identifying the command against the information providing system and a domain identifier for identifying a domain for executing the command. The command executing program allows the processing means to execute the following steps:

(a) receiving a command execution request together with the command identifier of the command, and the domain identifier of the domain to which a content calling the command belongs from an external terminal device through the communicating means;

(b) reading out the entity of the command correlated with a combination of the received command identifier and the received domain identifier from the storage means; and (c) executing the command according to the entity of the command which has been read out.

The invention defined in claim 4 includes a method for executing a content used for a computer system, which comprises the terminal device and the information providing system having a plurality of aliases of its domain, each connected to a communication network. And the information providing system includes the storage means for storing the domain identifier for identifying the aliases, correlated with the content identifier for identifying the content. And the processing means of the terminal device execute (a) transmitting a content execution request along with a content identifier of the content to an information providing system. And the processing means of the information providing system execute the following steps:

(b) receiving the content execution request along with the content identifier of the content from the terminal device;

(c) reading out the domain identifier correlated with the received content identifier;

(d) generating an address of the content according to the received content identifier and the read out domain identifier;

(e) transmitting the generated address of the content to the terminal device;

(f) receiving the generated address of the content from the information providing device;

(g) acquiring a content corresponding to the address in a domain of the received address; and (h) executing the acquired content.

The invention defined in claim 5 is a method to execute the contents defined in claim 4 characterized that the domain identifier for identifying the aliases, correlated with the content identifier for identifying the content is provided from the terminal device through the communication network.

Effect of Invention

Execution of a predetermined command called from a content can be limited by executing the command corresponding to the command identifier according to a combination of the command identifier and the domain identifier. Leakage of their respective data and functions among application programs can be prevented by generating an address of the content according to the content identifier and the domain identifier.

BRIEF DESCRIPTION OF THE FIGURES

FIG. 4 shows a structural drawing of a command information file, according to an example embodiment of the present disclosure.

FIG. 5 shows a structural drawing of a permission information file, according to an example embodiment of the present disclosure.

FIG. 12 shows a structural drawing of a command information file, according to an example embodiment of the present disclosure.

FIG. 13 shows a structural drawing of a content information file, according to an example embodiment of the present disclosure.

EXAMPLE EMBODIMENTS

Figure 1:
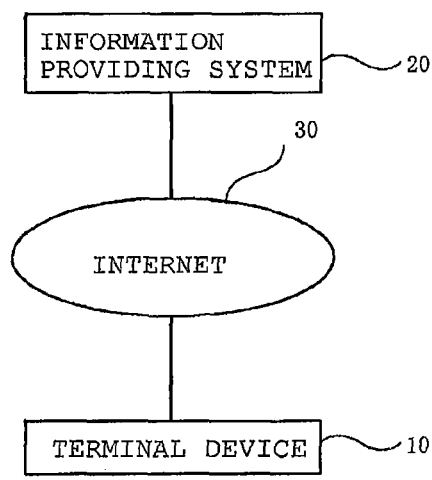
FIG. 1 shows a block diagram illustrating a whole configuration of the computer system of an embodiment, according to an example embodiment of the present disclosure.

Referring to the drawings, preferred embodiments of the invention are described below.

FIG. 1 is a block diagram illustrating a whole configuration of a computer system in accordance with an embodiment of the disclosure. A terminal device 10 and an information providing device 20 are connected to the Internet 30 as a communication network. Here, it does not matter whether the terminal device 10 has wired connection or wireless, connection to the Internet 30.

Figure 2:
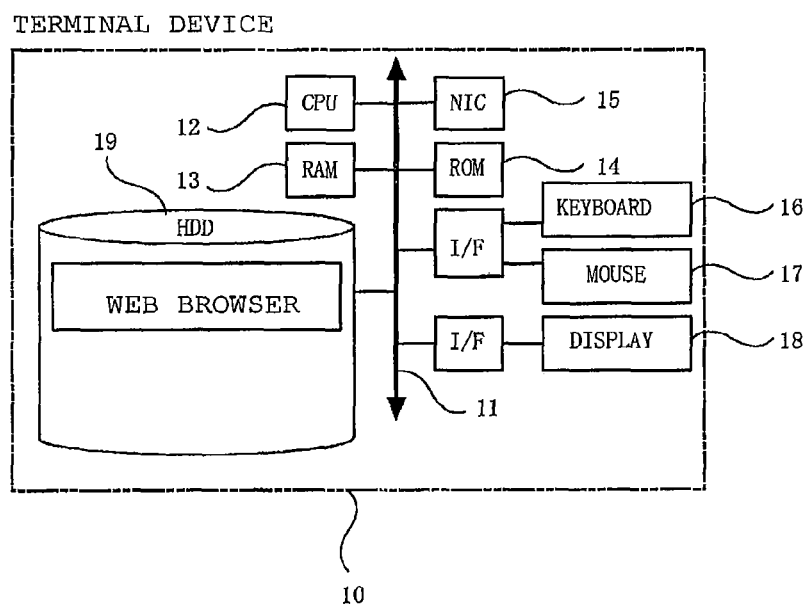
FIG. 2 shows a block diagram of a terminal device, according to an example embodiment of the present disclosure.

FIG. 2 is a block diagram illustrating the terminal device 10.

A CPU 12 as processing means; a RAM 13, a ROM 14, and a HDD (Hard Disk Drive) 19 as storage means; a keyboard 16 and a mouse 17 as input means; a display: 18 as displaying means; a NIC (Network Interface Card) 15 as communicating means are connected to a bus 11. Programs such as a web browser program are stored in the HDD 19. The CPU of the terminal device 10 executes the web browser program to execute and display a content provided by the information providing system 20. Examples of the terminal device 10 include a PC (Personal Computer), a PDA (Personal Digital Assistance), and a cellular phone having an Internet connection function, but the PC is applied in this embodiment.

Figure 3:
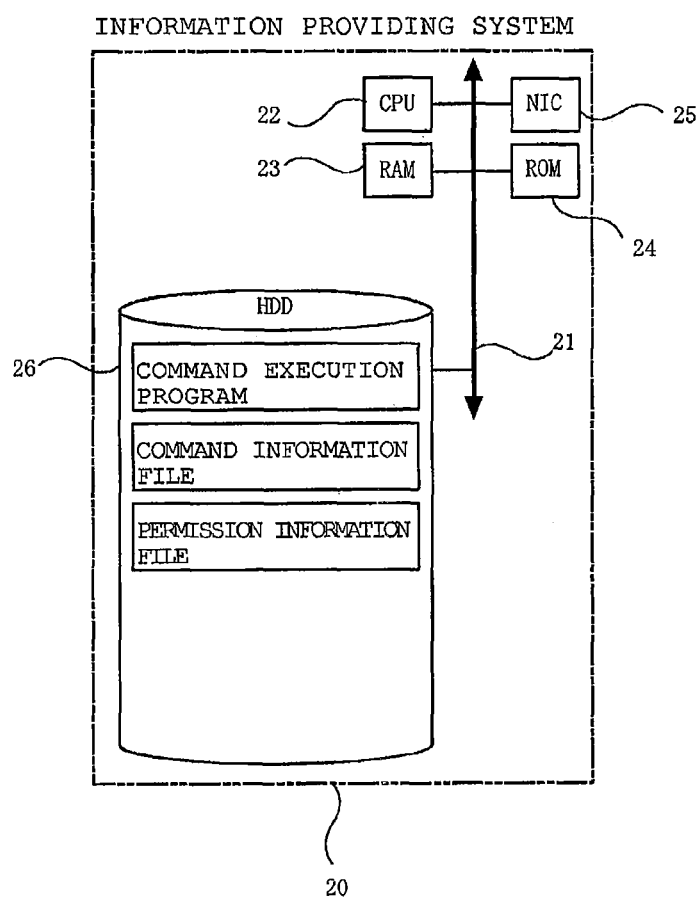
FIG. 3 shows block diagram of an information providing system, according to an example embodiment of the present disclosure.

FIG. 3 is a block diagram illustrating the information providing system 20.

A CPU 22 as processing means; a RAM 23, a ROM 24, and a HDD (Hard Disk Drive) 26 as storage means; a NIC (Network Interface Card) 25 as communicating means are connected to a bus 21. A command execution program, a command information file, a permission information file, or the like are stored in the HDD 26. The CPU of the information providing system 20 executes the command execution program to execute a predetermined command. Also, the information providing system 20 includes a plurality of aliases of its domain using a DNS (Domain Name System). In this embodiment, A URL (Uniform Resource Locator) as an address of the information providing system 20 is represented by three aliases: "http://domain1", "http://domain2", and "http://domain3". Moreover, in this embodiment, a typical web server is applied as the information providing system 20.

FIG. 4 is a structural diagram illustrating the command information file. In the command information file, there is stored an entity of a command correlated with a combination of a command identifier for identifying the command against the information providing system 20 and a domain identifier for identifying a domain for executing the command. Examples of the command identifier include a command name, and examples of the domain identifier include a domain name. Furthermore, examples of the entity of the command include an execution content of the command. In the second record of FIG. 4, there is stored an entity of a command "1s/root" correlated with a combination of a command identifier "cmd001(1s)" and a domain identifier "domain1". Here, the CPU of the information providing system 20 reads out the entity of the command correlated with a combination of the command identifier and the domain identifier to execute the command according to the entity of the command.

FIG. 5 is a structural diagram illustrating the permission information file. In the permission information file, there is stored a permission identifier for identifying an access right to a content correlated with a combination of a content identifier for identifying the command and a domain identifier for identifying a domain for executing the content. Examples of the permission identifier include a permission used for a UNIX (registered trademark) system. In the first record of FIG. 5, there is stored a permission identifier "p1(rw-)" correlated with a combination of a content identifier "content001" and the domain identifier "domain1". Here, the CPU of the information providing system 20 reads out the permission identifier correlated with a combination of the content identifier and the domain identifier from the permission information file to identify the access right to the content corresponding to the content identifier according to the read out permission identifier.

Next, operation of the computer system in accordance with this embodiment will be described.
(Embodiment 1)

Figure 6:
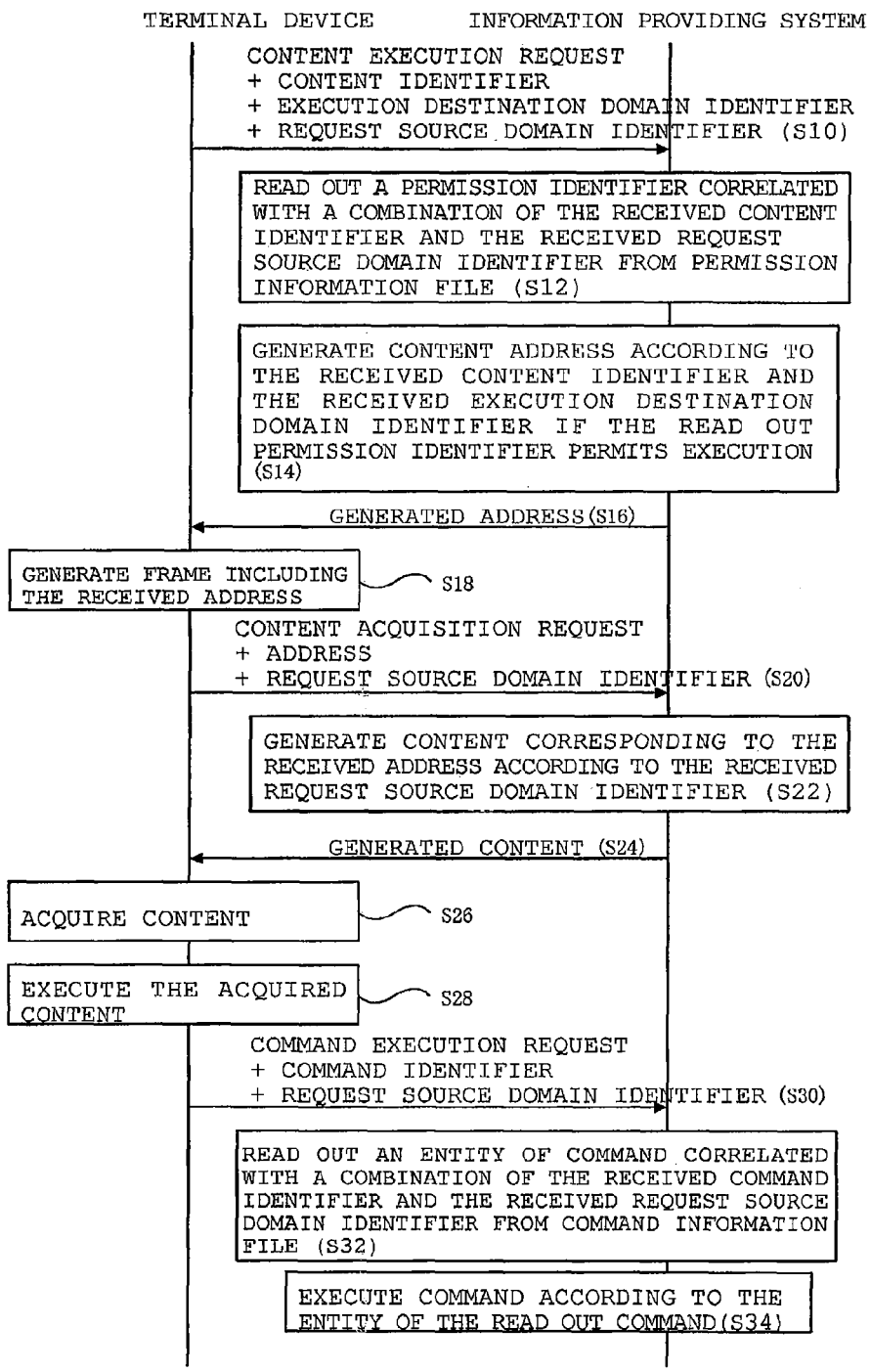
FIG. 6 shows a flowchart of the terminal device and the information providing system in a first example embodiment.

FIG. 6 is a flowchart for the terminal device 10 and the information providing system 20.

The CPU of the terminal system 10 accepts through the keyboard an application program execution request as a content along with an application name "content002" as a content identifier of the content, and an execution destination domain identifier "domain2" of the content. Then, the CPU of the terminal system 10 transmits to the information providing system 20 the accepted content execution request, the accepted content identifier "content002", the accepted execution destination domain identifier "domain2", and the request source domain identifier "domain1" of the content(S10). Here, the request source domain identifier is transmitted using a variable "HTTP-REFERER".

The CPU of the information providing system 20 receives from the terminal device 10 the content execution request, the content identifier "content002", the execution destination domain identifier "domain2", and the request source domain identifier "domain1" of the content. Then, the CPU of the information providing system 20 reads out from the permission information file a permission identifier "p3(r–x)" correlated with a combination of the received content identifier "content002" and the received request source domain identifier "domain1" (S12). Then, the CPU of the information providing system 20 generates an content address "http://domain2/content002" according to the received content identifier "content002" and the received the execution destination domain identifier "domain2", if the read out permission identifier "p3(r–x)" permits execution (S14). The CPU of the information providing system 20 then transmits the generated address to the terminal device 10 (S16).

The CPU of the terminal device 10 receives the address "http://domain2/content002". Then, the CPU of the terminal device 10 generates an inline frame as a frame including the received address "http://domain2/content002" as a reference destination (S18). Then, the terminal device uses the inline frame to transmit a content acquisition request along with the address "http://domain2/content002", and the request source domain identifier "domain1" of the content to the information providing system 20 (S20). Here, the request source domain identifier is transmitted using the variable "HTTP-REFERER".

The CPU of the information providing system 20 receives the content acquisition request along with the address "http://domain2/content002", and the request source domain identifier "domain1". Then, the CPU of the information providing system 20 generates a content corresponding to the received address according to the received request source domain identifier (S22). For example, a content to redirect to another domain may be generated if the request source domain identifier does not permit execution of the content corresponding to the address. Then, The CPU of the information providing system 20 transmits the generated content to the terminal device 10 (S24). Here, the content generated at S22 may be a static content previously stored in the HDD of the information providing system 20.

The CPU of the terminal device 10 receives the generated content, and acquires the content (S26). Then, the CPU of the terminal device 10 executes an application program as the acquired content (S28). Next, The CPU of the terminal device 10 accepts a command execution request along with a command identifier "cmd003" through the keyboard 16. Then, the CPU of the terminal device 10 transmits the accepted command execution request, the accepted command identifier "cmd003", and the request source domain identifier "domain2" of the command to the information providing system 20 (S30). Here, the request source domain identifier is transmitted by the variable "HTTP-REFERER".

The CPU of the information providing system 20 receives the command execution request, the command identifier "cmd003", and the request source domain identifier "domain2" of the command. Then, the CPU of the information providing system 20 reads out from the command information file an entity of a command "send (only 100 times/hour)" correlated with a combination of the received command identifier "cmd003" and the received request source domain identifier "domain2" (S32). Then, The CPU of the information providing system 20 executes the command according to the entity of the command which has been read out (S34).

Accordingly, the execution content is changed according to the domain even if the command name is the same. For example, even if the command name is equally an "ls" command, a default value of a parameter of the ls command is changed like an "ls/root" command or an "ls/root/webapi" command according to a combination of the command name and the domain name. Similarly, even if the command name is equally a "read" command, a range to be read out is changed like a "read all" command or a "read first 10 lines" command according to a combination of the command name and the domain name. Further, limitations such as sending hundred mails per hour are added to a mail sending command, and a command corresponding to a "list" command is executed for a command name "read", according to a combination of the command name and the domain name. Moreover, leakage of their respective data and functions among application programs is prevented.

(Modification 1 of Embodiment 1)

The command information file of FIG. 12 is applied in place of the command information file of FIG. 4. FIG. 12 is a structural diagram illustrating the command information file. The domain identifier for identifying a domain permitted to execute a command corresponding to the command identifier, correlated with the command, identifier for identifying the command against the information providing system 20 is stored in the command information file. Examples of the command identifier include a command name, and examples of the domain identifier include a domain name. In the first record of FIG. 4, the domain name "domain1" correlated with the command name "cmd001" as the command identifier is stored. The CPU of the information providing system 20 reads out the domain identifier correlated with the command identifier to identify a domain capable of executing a command corresponding to the command identifier.

The CPU of the information providing system 20 reads out the domain identifier correlated with the command identifier received from the terminal device 10 from the command information file, and if the read out domain identifier is the same as the execution destination domain identifier received from the terminal device 10, a command corresponding to the received command identifier is executed. Here, a command corresponding to the received command identifier may be executed, if the read out domain identifier is not the same as the execution destination domain identifier received from the terminal device 10.

(Modification 2 of Embodiment 1)

In this embodiment, in addition to Embodiment 1, the information providing system 20 stores the content information file in the HDD. FIG. 13 is a structural diagram illustrating the content information file. The execute destination domain identifier for executing the content, correlated with the content identifier for identifying a content is stored in the content information identifier. Examples of the content identifier include an application name of an application program, and examples of the domain identifier include a domain name. In the first record of FIG. 13, the execution destination domain identifier "domain1" correlated with the content identifier "content001" is stored. Here, the CPU of the information providing system 20 reads out the execution destination domain identifier correlated with the content identifier to identify the execution destination domain identifier of the content.

The CPU of the information providing system 20 reads out the domain identifier correlated with the received content identifier from the content information file to use it as the execution destination identifier, if it does not receive the execution destination domain identifier of the content from the terminal device 10 at S10.

(Modification 3 of Embodiment 1

In Embodiment 1, the inline frame is generated at S18 to acquire a content corresponding to the received address in the inline frame. However, the content is acquired in a request source page of the content without generating the inline frame.

Alternatively, a predetermined callback function is previously defined in the prepared inline frame and the callback function is specified from the request source page of the content to execute a XMLHttpRequest. In this manner, a content corresponding to the received address may be acquired into the prepared inline frame. Here, the callback function is defined so as to load a predetermined page according to data acquired by the XMLHttpRequest.

(Embodiment 2)

Figure 7:
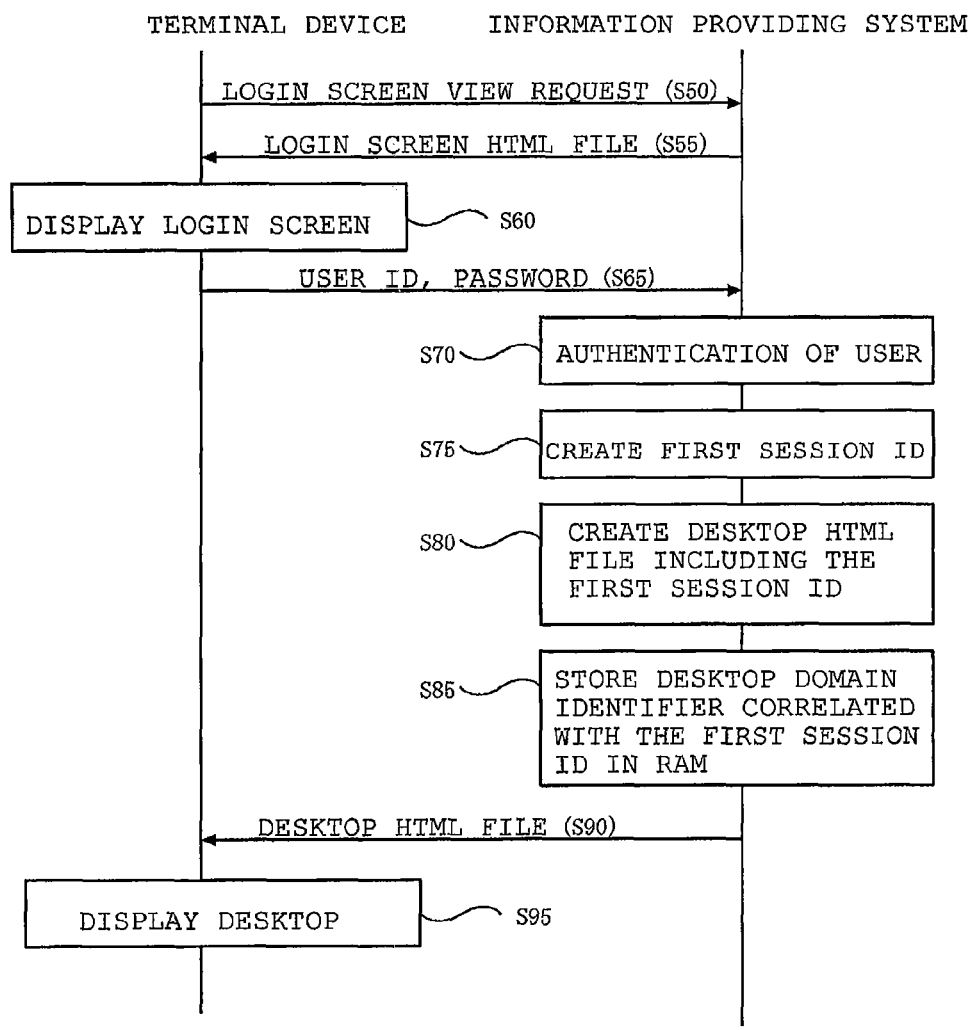
FIG. 7 shows a flowchart of the terminal device and the information providing system in a process of displaying a desktop as a first content, according to an example embodiment of the present disclosure.

FIG. 7 is a flowchart for the terminal device 10 and the information providing system 20 in a process of displaying a desktop as a first content.

The CPU of the terminal device 10 accepts, for example, an address "http://domain1/login.htm" as a predetermined URL corresponding to the information providing system 20 through the keyboard 16. Then, the CPU of the terminal device 10 transmits a login screen view request according to the accepted URL to the information providing system 20 (S50).

The CPU of the information providing system 20 receives the login screen view request from the terminal device 10. Then, the CPU of the information providing system 20 reads out a HTML (HyperText Markup Language) file of the login screen from the HDD, and transmits the read out HTML file of the login screen to the terminal device 10 (S55).

The CPU of the terminal device 10 receives the HTML file of the login screen from the information providing system 20. Then, the CPU of the terminal device 10 displays the login screen on its display through a web browser according to the received HTML file of the login screen (S60). Then, the CPU of the terminal device 10 accepts a user ID and a password as a user identifier for identifying a user from the keyboard 16 through the login screen. Moreover, the CPU of the terminal device 10 transmits the accepted user ID and password to the information providing system 20 (S65).

The CPU of the information providing system 20 receives the user ID and password from the terminal device 10. Then, the CPU of the information providing system 20 determines whether a combination of the received user ID and password is stored in a predetermined user information file, to authenticate a user (S70). Here, the user information file is previously stored in the HDD. Then, if a combination of the received user ID and password is stored in the predetermined user information file, the CPU of the information providing system 20 determines that the authentication of the user has succeeded, and conducts the following processes.

The CPU of the information providing system 20 creates a first session ID (S75). In this embodiment, for example, a session ID "999" is created as the first session ID. Here, the session ID is created as a value unpredictable to a third party using a combination of random numbers and hash values, but for illustrative purpose a value predictable to a third party is used as described above.

Next, the CPU of the information providing system 20 creates a HTML file of a desktop as a first content including the first session ID "999", and stores it in the HDD (S80). Here, in this embodiment, the first session ID "999" is stored as a value of a hidden field "SID" of the desktop. Moreover, a URL of the desktop is, for example, an address "http://domain1/desktop.htm".

The CPU of the information providing system 20 extracts the domain identifier "domain1" of a domain to which the desktop belongs, from the URL of the desktop. Then, the extracted domain identifier "domain1" of the domain to which the desktop belongs, correlated with the created first session ID "999" is stored in the RAM (S85). Then, the CPU of the information providing system 20 transmits the created HTML file of the desktop to the terminal device 10 (S90).

Figure 10:
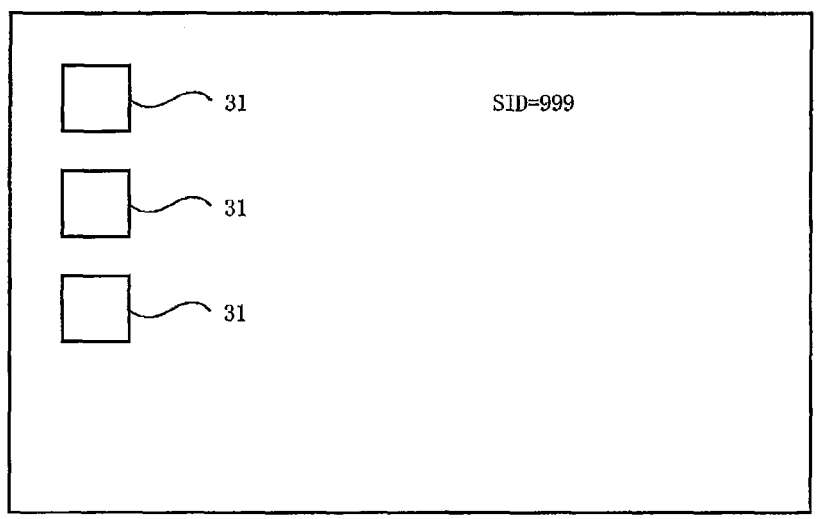
FIG. 10 shows a block diagram illustrating an example of the desktop, according to an example embodiment of the present disclosure.

The CPU of the terminal system 10 receives the HTML file of the desktop from the information providing system 20. The CPU of the terminal system 10 displays the desktop on its display through the web browser according to the received HTML file of the desktop (S95). FIG. 10 is a block diagram illustrating one example of the desktop. The desktop includes an icon 31 for initiating application programs. Here, the icon 31 correlated with a combination of a predetermined content identifier and a predetermined execution destination domain identifier is stored in the HTML file of the desktop. Then, when the icon 31 has been clicked on by the mouse, the CPU of the terminal system 10 reads out the content identifier and the execution destination domain identifier, each correlated with the icon 31 from the HTML file, and transmits them to the information providing system 20.

Figure 8:
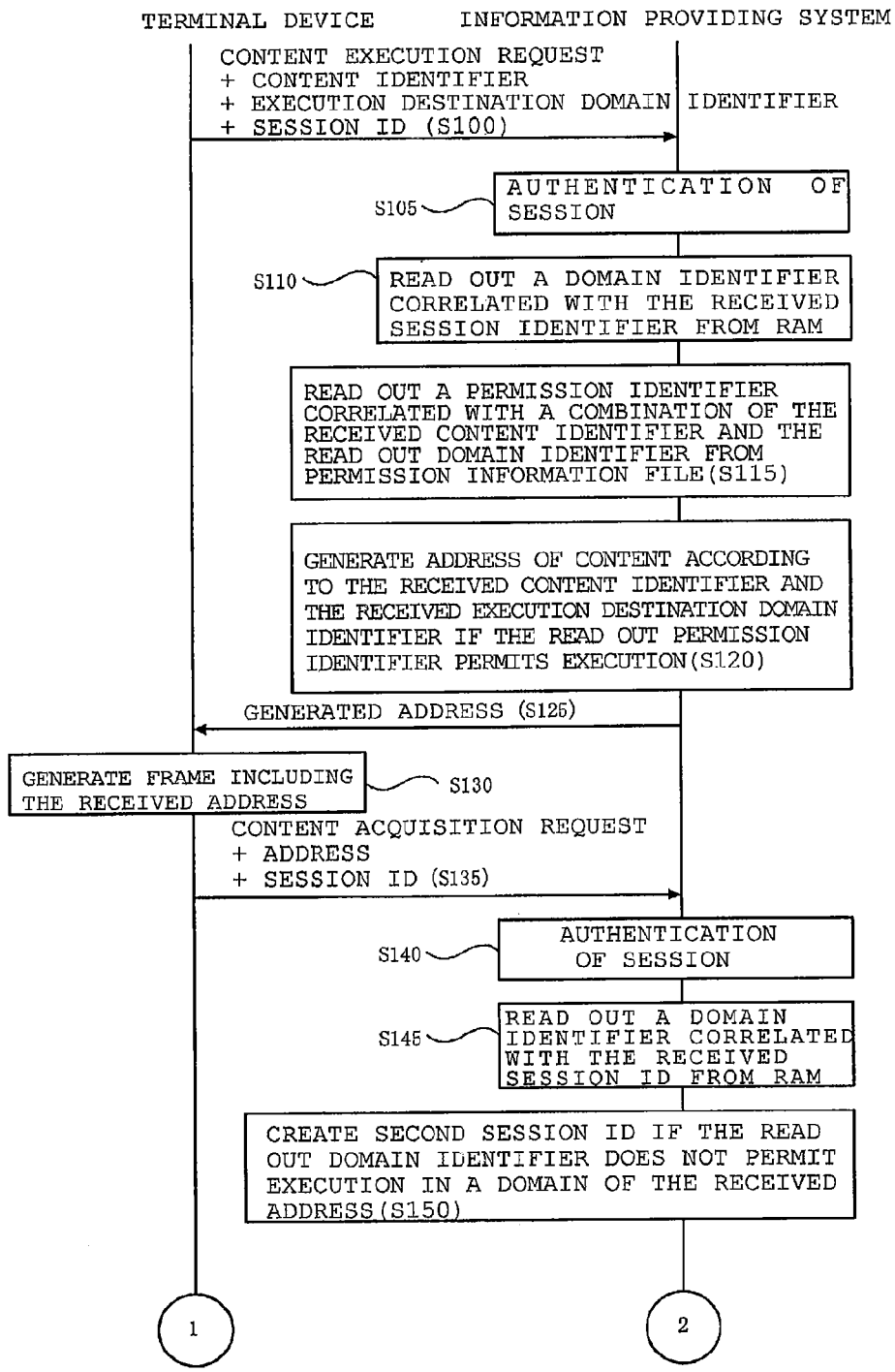
FIGS. 8 and 9 show a flowchart of the terminal device and the information providing system in a process of displaying an application screen as a second content, according to an example embodiment of the present disclosure.
Figure 9:
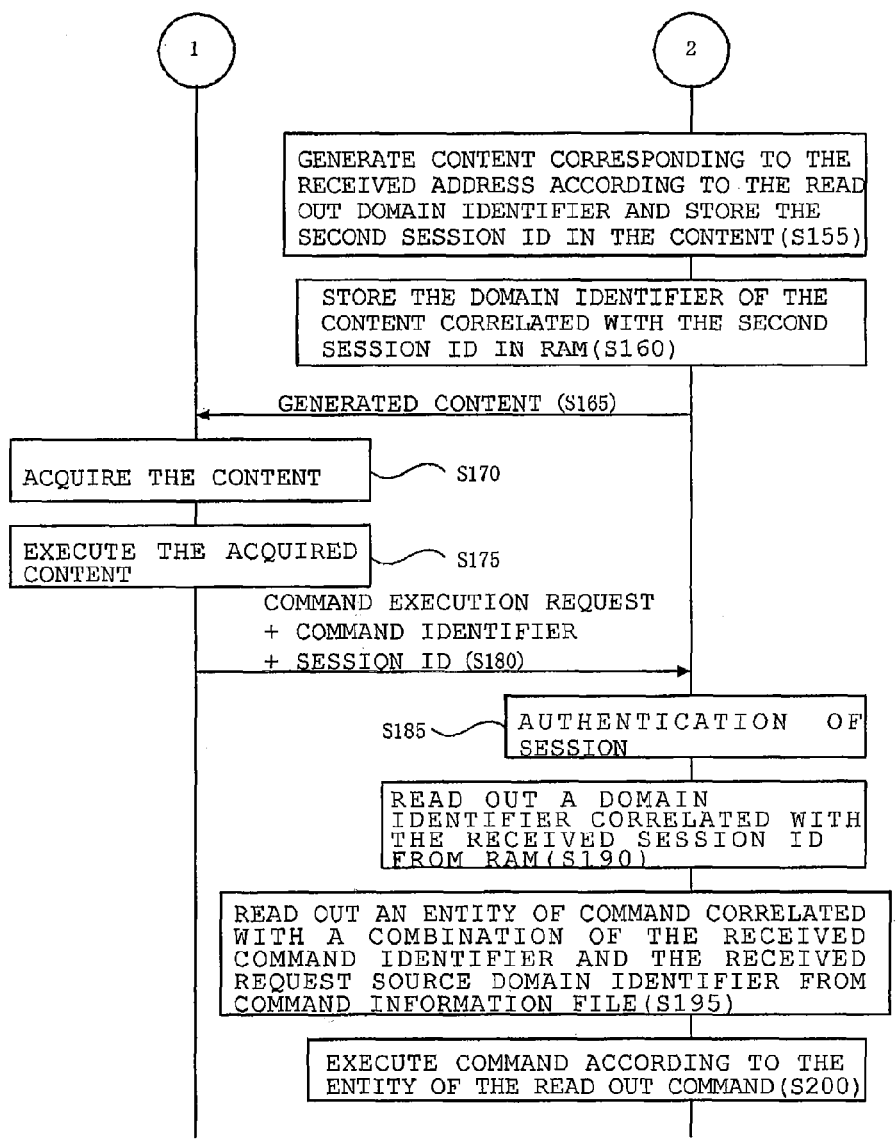

FIGS. 8 and 9 are a flowchart for the terminal device 10 and the information providing system 20 in a process of displaying an application screen as a second content.

When the icon 31 has been clicked on by the mouse, the CPU of the terminal system 10 reads out, for example, the content execution request, the content identifier "content002" and the execution destination domain identifier "domain2" correlated with the icon 31, and the first session "999" from the HTML file of the desktop, and transmits them to the information providing system 20 (S100).

The CPU of the information providing system 20 receives the content identifier "content002", the execution destination domain identifier "domain2", and the first session ID "999" from the terminal device 10. Then, the CPU of the information providing system 20 determines whether the received session ID is stored in the RAM 23 to authenticate the session (S105). Then, if the received session ID is stored in the RAM, the CPU of the information providing system 20 determines that the authentication of the session has succeeded, and conducts the following processes.

The CPU of the information providing system 20 reads out the domain identifier "domain1" correlated with the received session ID "999" from the RAM (S110). Then, the CPU of the information providing system (20 reads out a permission identifier "p3(r-x)" correlated with a combination of the received content identifier "content002" and the read out domain identifier "domain1" from the permission information file (S115). Then, if the read out permission identifier "p3(r-x)" permits execution, the CPU of the information providing system 20 generates an address "http://domain2/content002" of the content according to the received content identifier "content002" and the received execution destination domain identifier "domain2" (S120). Then, the CPU of the information providing system 20 transmits the generated address to the terminal device 10 (S125).

The CPU of the terminal device 10 receives the address "http://domain2/content002". Then, the CPU of the terminal device 10 generates an inline frame as a frame including the received address "http://domain2/content002" as a reference destination (S130). Then, the terminal device 10 uses the inline frame to transmit a content acquisition request along with the address "http://domain2/content002", and the first session ID "999" to the information providing system 20 (S135).

The CPU of the information providing system 20 receives the content acquisition request along with the address "http://domain2/content002", and the first session ID "999". Then, the CPU of the information providing system 20 determines whether the received session ID is stored in the RAM to authenticate the session (S140). Then, if the received session ID is stored in the RAM 23, the CPU of the information providing system 20 determines that the authentication of the session has succeeded, and conducts the following processes.

The CPU of the information providing system 20 reads out the domain identifier "domain1" correlated with the received session ID "999" from the RAM (S145). Then, if the read Out domain identifier "domain1" permits execution in a domain of the received address "http://domain2/content002", the CPU of the information providing system 20 creates a second session ID "111" (S150). Then, the CPU of the information providing system 20 generates a content corresponding to the received address according to the read out domain identifier, and stores the second session ID "111" in the generated content (S155). Then, the CPU of the information providing system 20 stores the domain identifier "domain2" of the content correlated with the second session ID "111" in the RAM (S160). Then, the CPU of the information providing system 20 transmits the generated content to the terminal device 10 (S165). Here, the content generated at S155 may be a static content previously stored in the HDD of the information providing system 20.

Moreover, examples of methods for passing the session ID to a newly generated content include a method for passing it as a parameter of GET or POST, and a method using Cookie, but in this embodiment the method for passing it as a parameter of GET is applied. Also, if another content of the execution destination domain already exists and the content has the session ID, the newly generated content of the execution destination domain can freely read out and use the session ID included in the existing content of the execution destination domain. Therefore, a process to generate the second session ID and pass it is not necessary.

Figure 11:
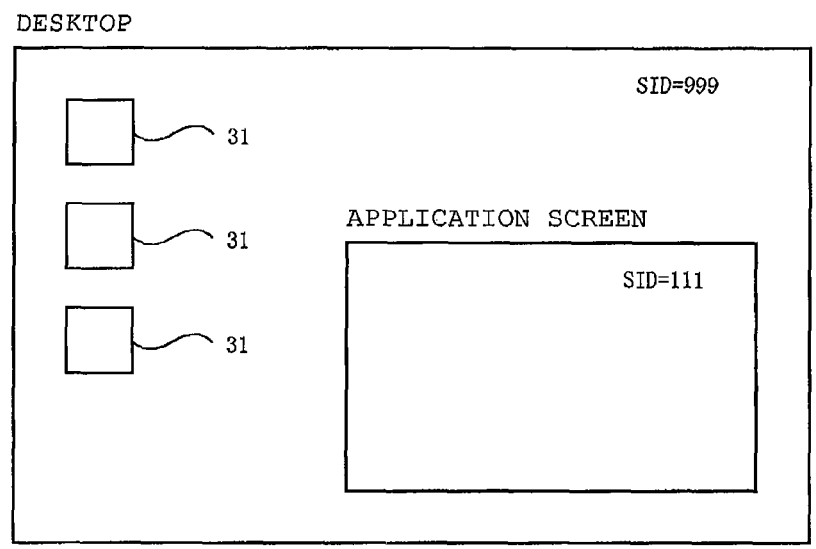
FIG. 11 shows a block diagram illustrating an example of the desktop which displays the application screen on an in-line frame, according to an example embodiment of the present disclosure.

The CPU of the terminal device 10 receives the generated content, and acquires the content (S170). Then, the CPU of the terminal device 10 executes an application program as the required content (S175). FIG. 11 is a block diagram illustrating one example of the desktop displaying an application screen in the inline frame as a result of the execution. Here, the application screen includes a GUI (Graphical User Interface) of the application program.

Next, the CPU of the terminal device 10 accepts, for example, the command execution request along with the command identifier "cmd001" through the keyboard. Then, the CPU of the terminal device 10 transmits the accepted command execution request, the accepted command-identifier "cmd001", and the second session ID "111" to the information providing system 20 (S180).

The CPU of the information providing system 20 receives the command execution request, the command identifier "cmd001", and the second session ID "111". Then, the CPU of the information providing system 20 determines whether the received session ID is stored in the RAM to authenticate the session (S185). Then, if the received session. ID is stored in the RAM 23, the CPU of the information providing system 20 determines that the authentication of the session has succeeded, and conducts the following processes.

The CPU of the information providing system 20 reads out the domain identifier "domain2" correlated with the received session ID "111" from the RAM (S190). Then, the CPU of the information providing system 20 reads out an entity of a command "ls/root/webapi" correlated with a combination of the received command identifier "cmd001" and the read out domain identifier "domain2" from the command information file (S195). Then, the CPU of the information providing system 20 executes the command according to the entity of the command which has been read out(S200).

Here, by way of comparison, a related art will be described in which execution of a predetermined command called from an application program as a content is limited by issuing the session ID defining different authority with respect to each application program as a content.

In the related art, when a predetermined function is achieved by the plurality of application programs as a content executed by the web browser, provided that these contents belong to the same frame or the same domain even in a different frame, their respective data can be mutually accessed. This is because crossdomain security limitation is not available. Therefore, the session ID having authority more than assigned authority can be acquired in an unauthorized manner by reading out the session ID of one content from the other content.

Moreover, in another related art, there are (1) a method for executing a plurality of contents of application programs in the same frame, and (2) a method for opening other frames inside to execute a content of an application program with respect to each frame. When other frames are opened inside, it should be understood that the content of the application program with respect to each frame belongs to the same domain, that is, the same information providing system. Typically, the method (1) is applied because a code for linking data among the respective frames becomes complicated in the method (2).

In the known examples described above, separation of authority between the application program and the system becomes difficult. Therefore, data of the system can be acquired by using the application program created by a third party.

However, in accordance with the present invention, even when the same content, component, or application program is called, operations, such as changing a content of a process, or preventing data leakage among application programs, becomes possible by switching over the domain to which the content'belongs displayed in the calling source frame. For example, when the same text editor is used, it becomes possible to change operations between when it is executed as a content of the identifier "domain1" and when it is executed as a content of the identifier "domain2".

As an authority setting for changing the process at this time, it is possible to set to the content, for example, so as to limit execution of commands other than one reading out for activation by domain, or to set to the component, for example, so as to limit execution of the component by domain. Whether such settings are permitted or not is stored in a predetermined setting file.

Other Embodiment

Assume that a domain to which the desktop used by a user A belongs is a domain identifier "visionarts.com". Also, assume that three subdomains: "subdomain1.visionarts.com", "subdomain2.visionarts.com" and "subdomain3.visionarts.com" are prepared by settings of a DNS zone file. In this embodiment, in the permission file, the permission identifier correlated with a combination of the content identifier and the domain identifier "visionarts.com" permits "reading", "writing", and "execution". Therefore, edition of the content information file, the command information file, and the permission information file are permitted in a domain corresponding to the domain identifier "visionarts.com".

The user A downloads'a trial version of an application program "apll" created by others, and changes so as to execute it from the subdomain "subdomain3.visionarts.com" through a predetermined application domain manager (GUI). That is, the CPU of the information providing system 20 receives the application program "apll" as the content identifier and the subdomain "subdomain3.visionarts.com" as the domain identifier from the terminal device 10 through the application domain manager (GUI). Then, the CPU of the information providing system 20 stores the subdomain "subdomain3.visionarts.com" as the received domain identifier correlated with the application program "apll" as the received content identifier in the content information file. Here, the user A may update the domain information file as appropriate to change a command capable of being executed in the subdomain "subdomain3.visionarts.com"

When the user A has determined that the application program is reliable after using it for a certain time, the user A changes the application program "apll" with one capable of being executed from the subdomain "subdomain1.visionarts.com" through the application domain manager (GUI). That is, the CPU of the information providing system 20 receives an identifier "apll" as the content identifier, and an identifier "subdomain1.visionarts.com" as the domain identifier from the terminal device 10 through the application domain manager (GUI). Then, the CPU of the information providing system 20 stores the identifier "subdomain1:visionarts.com" as the received domain identifier correlated with the identifier "apll" as the received content identifier in the content information file. Alternatively, the user A may update the domain information file to change a command capable of being executed in the subdomain "subdomain3.visionarts.com" through the application domain manager (GUI).

Accordingly, even when the same content is activated, permission of the content is changed according to the activated domain.

Here, the present invention is not limited to the above-described embodiments. For example, the alias of the domain assigned to one information providing system are prepared as many as the number of authority required to be separately set. Also, when a document as a content is correlated with a predetermined command or an application program for displaying the content, execution of the command or the application program may be limited according to a domain to which the content belongs, to control the display of the content. Moreover, execution authority may be set with respect to each domain corresponding to an extension of the content.

EXPLANATION OF LETTERS OR NUMERALS

10 Terminal device
11 Bus
12 CPU (processing means)
13 RAM (storage means)
14 ROM (storage means)
15 NIC (communicating means)
16 Keyboard (input means)
17 Mouse (input means)
18 Display (displaying means)
19 HDD (storage means)
20 Information providing system
21 Bus
22 CPU (processing means)
23 RAM (storage means)
24 ROM (storage means)
25 NIC (communicating means)
26 HDD (storage means)
30 the Internet (communication network)
31 The icon for initiating an application program

What is claimed is:

1. An information processing apparatus comprising:
a communication unit;
a storage unit;
a processor; and
a memory device storing instructions which when executed by the processor, causes the processor to work with the communication unit and the storage unit to:
store a command information file including a domain identifier correlated with a command identifier for identifying a command against a information providing system in the storage unit, wherein the domain identifier identifies a domain permitted to execute the command identified by the command identifier;
receive a command execution request together with a received command identifier of a received command, and a received domain identifier of a domain to which an application program calling the received command belongs, from an external terminal device through the communication unit;
read out, from the command information file, the domain identifier correlated with the received command identifier from the storage unit; and
execute the received command according to a first entity of the command that corresponds to the received command identifier and the received domain identifier, wherein the received command is executed according to a second entity of the command that corresponds to the same received command identifier and a different domain identifier, the second entity of the command corresponding to a similar but more limited version of the first entity of the command.

2. The information processing apparatus of claim 1, wherein the processor is further caused to:
execute the received command corresponding to the received command identifier, when the execution destination domain identifier received from the external terminal device and the domain identifier read out from the storage unit are not identical.

3. An information processing apparatus comprising:
a communication unit;
a storage unit;
a processor; and
a memory device storing instructions which when executed by the processor, causes the processor to work with the communication unit and the storage unit to:
store, in the storage unit, a command information file including an entity of a command correlated with a combination of a command identifier for identifying the command and a domain identifier for identifying a domain for executing the command;
receive a command execution request together with a received command identifier of a received command, and a received domain identifier of a domain to which an application program calling the received command belongs, from an external terminal device through the communicating unit;
read out the entity of the command correlated with a combination of the received command identifier and the received domain identifier from the command information file stored in the storage unit; and execute the received command according to the entity of the command read out from the storage unit, wherein the executed command is executed in a more limited manner according to the entity of the command compared to a second entity of the command corresponding to a different domain identifier.

4. A method for executing a content used for a computer system, which comprises a terminal device and an information providing system having an address represented by a plurality of aliases, each connected to a communication network, and the information providing system includes a storage unit the method comprising:

(a) storing a permission information file including a domain identifier for identifying the aliases correlated with a content identifier for identifying a content and a permission identifier for identifying an access right to the content;

(b) transmitting, by the terminal device, a content execution request along with a content identifier of the content to the information providing system, (c) receiving, by the information providing system, the content execution request along with the content identifier of the content from the terminal device;

(d) reading out the domain identifier and the permission identifier from the permission information file stored in the storage unit correlated with the received content identifier;

(e) generating an address of the content according to the received content identifier and the read out domain identifier if the permission identifier permits execution;

(f) transmitting the generated address of the content to the terminal device, (g) receiving, by the terminal device, the generated address of the content from the information providing device;

(h) acquiring a content corresponding to the address in a domain of the received address;

(i) executing the acquired content;

(j) transmitting by the terminal device, a command execution request including a command identifier of a command and the domain identifier;

(k) reading out an entity of the command correlated with the command identifier and the domain identifier; and (l) executing the command according to the entity of the command, wherein the executed command is executed in a more limited manner according to the entity of the command compared to a second entity of the command corresponding to a different domain identifier.

5. The method of claim 4, wherein the domain identifier for identifying the aliases, correlated with the content identifier for identifying the content is provided from the terminal device through the communication network.

6. The information processing apparatus of claim 3, wherein the entity of the command is an execution content of the command.

7. The information processing apparatus of claim 1, wherein the command identifier is a command name, and the domain identifier is a domain name used in a URL using a Domain Name System (DNS).

8. The method of claim 4, wherein the generated address is a URL including the domain identifier.

9. The information processing apparatus of claim 3, wherein the command information file includes a plurality of entities of the command correlated with a same command identifier and different domain identifiers.

10. The information processing apparatus of claim 1, wherein an execution of the same received command is more limited in a third domain than in the first domain and the second domain.

11. The method of claim 4, wherein the content corresponding to the address in the domain of the received address is acquired without leaking information to other application programs.

12. The information processing apparatus of claim 1, wherein the first entity of the command includes a first execution content of the received command and the second entity of the command includes a second execution content of the received command.

13. The information processing apparatus of claim 1, wherein the received command is executed to perform a read of first content according to the first entity of the command and executed to perform a read of second content according to the second entity of the command, wherein the second content is a portion of the first content.

* * * * *